(12) United States Patent
Inoue et al.

(10) Patent No.: US 9,769,777 B2
(45) Date of Patent: Sep. 19, 2017

(54) BASE STATION APPARATUS AND CALIBRATION METHOD

(71) Applicant: NTT DOCOMO, INC., Tokyo (JP)

(72) Inventors: Yuki Inoue, Tokyo (JP); Daiki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/910,515

(22) PCT Filed: Jul. 7, 2014

(86) PCT No.: PCT/JP2014/068086
§ 371 (c)(1),
(2) Date: Feb. 5, 2016

(87) PCT Pub. No.: WO2015/022823
PCT Pub. Date: Feb. 19, 2015

(65) Prior Publication Data
US 2016/0183209 A1 Jun. 23, 2016

(30) Foreign Application Priority Data

Aug. 13, 2013 (JP) ................................ 2013-168067

(51) Int. Cl.
*H04L 7/04* (2006.01)
*H04W 56/00* (2009.01)
(Continued)

(52) U.S. Cl.
CPC ........ *H04W 56/0015* (2013.01); *H01Q 1/246* (2013.01); *H01Q 3/267* (2013.01);
(Continued)

(58) Field of Classification Search
CPC ...... H04B 7/0626; H04B 17/12; H04B 17/21; H04B 7/0408; H04B 7/0452; H04B 17/11;
(Continued)

(56) References Cited

U.S. PATENT DOCUMENTS

| | | | |
|---|---|---|---|
| 2001/0005685 A1* | 6/2001 | Nishimori | H01Q 3/2605 455/562.1 |
| 2010/0075594 A1* | 3/2010 | Kim | H04L 25/0242 455/7 |
| 2012/0106501 A1* | 5/2012 | Kishiyama | H04L 1/0026 370/330 |

FOREIGN PATENT DOCUMENTS

| | | |
|---|---|---|
| JP | 2001-185933 A | 7/2001 |
| JP | 2002-353724 A | 12/2002 |

(Continued)

OTHER PUBLICATIONS

International Search Report issued in PCT/JP2014/068086 mailed on Sep. 30, 2014 (2 pages).

(Continued)

*Primary Examiner* — Leila Malek
(74) *Attorney, Agent, or Firm* — Osha Liang LLP

(57) ABSTRACT

When using a plurality of antenna elements, calibration is performed appropriately, while preventing processing time from increasing. A base station apparatus has a plurality of antenna elements; a combiner configured to receive and combine downlink transmission signals, each including a reference signal, from monitor ports provided corresponding to the antenna elements; a channel estimator configured to estimate a channel of the reference signal for each of the antenna elements; and a calibration controller configured to calculate a calibration correction value to be applied to each of the antenna elements based upon channel estimation result.

5 Claims, 17 Drawing Sheets

(51) Int. Cl.
  *H04B 17/12* (2015.01)
  *H01Q 1/24* (2006.01)
  *H01Q 3/26* (2006.01)
  *H04B 7/10* (2017.01)
  *H04B 7/0413* (2017.01)
(52) U.S. Cl.
  CPC ........... *H04B 17/12* (2015.01); *H04B 7/0413* (2013.01); *H04B 7/10* (2013.01); *H04W 56/0035* (2013.01)
(58) Field of Classification Search
  CPC .. H04B 7/0413; H04L 25/03343; G01S 3/023
  USPC .......... 455/115.1, 39; 342/174, 74; 370/252, 370/310, 334; 375/362
  See application file for complete search history.

(56) References Cited

FOREIGN PATENT DOCUMENTS

| | | |
|---|---|---|
| JP | 2005-130315 A | 5/2005 |
| JP | 2005-348235 A | 12/2005 |
| JP | 2006-279900 A | 10/2006 |
| JP | 2006-279903 A | 10/2006 |
| JP | 2008-166866 A | 7/2008 |
| JP | 2013-017187 A | 1/2013 |

OTHER PUBLICATIONS

Written Opinion of the International Searching Authority issued in PCT/JP2014/068086 mailed on Sep. 30, 2014 (4 pages).
Office Action issued in the counterpart Japanese Patent Application No. 2013-168067, dated Jul. 11, 2017 (14 pages).

\* cited by examiner

BASE STATION APPARATUS AND CALIBRATION METHOD

TECHNICAL FIELD

The present invention relates to a radio base station apparatus and a calibration method for array antennas.

BACKGROUND ART

Along with growth of high-speed and high capacity radio communications, it is expected that multi-branch antenna architecture such as active antenna systems (AASs) or massive MIMO (multi input multiple output) systems will become mainstream in the days ahead. In multi-branch antenna architecture, individual radio frequency (RF) transmitting circuits and RF receiving circuits are connected to respective antenna elements. An antenna port can be formed by a single antenna elements or a group of antenna elements.

When open-loop MIMO communication is carried out using multi-branch antenna systems, calibration is performed to reduce phase differences between antenna branches. If calibration is inappropriate, directivity diversity control is adversely affected, and base station coverage changes. The phase of signals between branches also changes due to characteristics of the RF circuits. For these reasons, it is desired to perform calibration as needed.

In the conventional technique, a known reference signal is typically used for calibration. On the other hand, a technique for generating a special signal for calibration is proposed. See, for example, Japanese Patent Laid-open Publication No. 2005-348235 A. In this proposed technique, an actually used downlink signal is employed as a reference signal. Antenna branches are switched in turn to monitor the downlink transmission signal and calibration is performed every time the output level of the amplifier of the RF transmission circuit varies.

SUMMARY OF THE INVENTION

Technical Problem to be Solved

It is anticipated that in the days ahead time taken for calibration will increase due to increase of the number of antenna elements. As the time taken for calibration increases, interruption of communication systems or limitation on communication bands may occur during calibration.

Besides, the conventional calibration technique is based on the premise that one antenna element corresponds to one antenna port or antenna branch. In the future, it is expected that either a single antenna element or a group of antenna elements will be used to form an antenna port, depending on the type of communications, such as ranks or the number of user multiplexing. Using simply a reference signal, of the existing system as it is will be insufficient to achieve appropriate antenna calibration.

Accordingly, it is an objective of the invention to provide a structure and a method capable of appropriately performing calibration handling either case of forming an antenna port with a single antenna element or a group of antenna elements, while preventing the processing time from increasing.

Means For Solving the Problem

To achieve the objective, in one aspect of the invention, a base station apparatus has a plurality of antenna elements, a combiner configured to receive and combine downlink transmission signals, each including a reference signal, from monitor ports provided to the respective antenna elements, a channel estimator configured to estimate a channel of the reference signal for each of the antenna elements, and a calibration controller configured to calculate a calibration correction value to be applied to each of the antenna elements based upon channel estimation result.

As an exemplified structure, the base station apparatus has multiple antenna ports, each antenna port being formed of one or more of said plurality of antenna elements, wherein the calibration controller is configured to add a phase difference to the respective antenna elements that form associated one of the antenna ports to determine a phase rotation quantity that maximizes the channel estimation result, and calculate a calibration correction value to be applied to each of the antenna ports based upon the determined phase rotation quantity.

As another exemplified structure, the base station apparatus has multiple antenna ports, each antenna port being formed of one or more of said plurality of antenna elements, wherein the calibration controller is configured to add a random phase difference repeatedly to the antenna elements that form associated one of the antenna ports, determine a current phase state of each of the antenna elements from a relationship between a phase rotation quantity acquired when adding the random phase difference and an associated channel estimation value, and calculate a calibration correction value to be applied to each of the antenna ports based upon the determined current phase state of each of the antenna elements.

Advantageous Effect of the Invention

Even if the number of antenna elements increases, appropriate calibration can be performed using an existing reference signal, while preventing the amount of calculation from increasing.

When each antenna port is formed of two or more antenna elements, calibrations between antenna elements and between antenna ports can be performed using an existing reference signal.

EMBODIMENTS TO CARRY OUT THE INVENTION

<First Embodiment>

Figure 1:
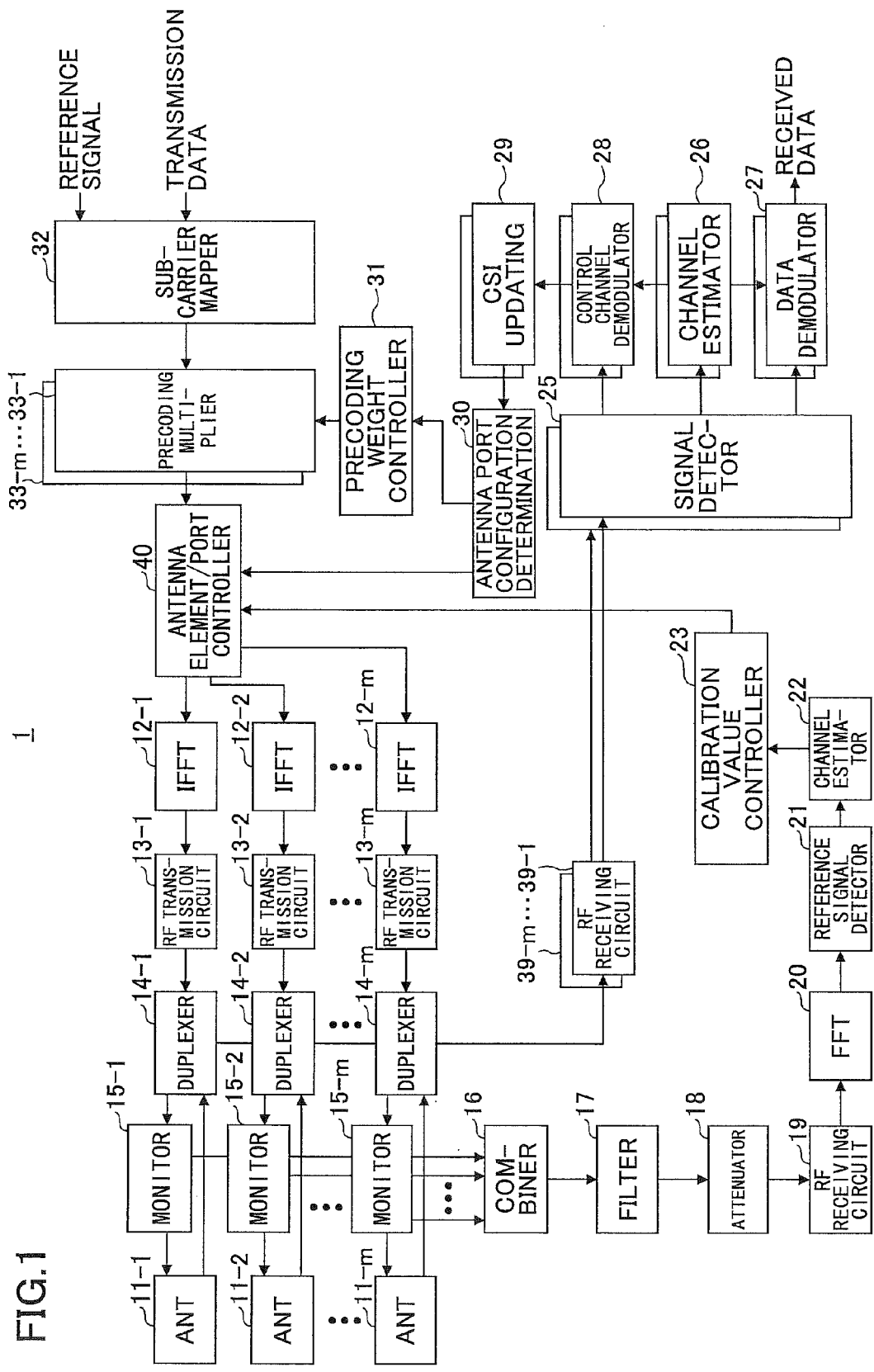
FIG. 1 is a schematic diagram of a base station apparatus according to the first embodiment.

FIG. 1 is a schematic diagram of a base station apparatus 1 according to the first embodiment. The base station apparatus has antennas 11-1 to 11-m (which may be referred to collectively as "antennas 11"), monitors 15-1 to 15-m (which may be referred to collectively as "monitors 15") provided corresponding to the respective antennas 11, and a calibration system to perform calibration for the antennas 11 based upon outputs from the monitors 15. The antennas 11 correspond to antenna elements in this example.

In the first embodiment, an existing reference signal is used for calibration. The reference signal is, for example, a channel state information reference signal (CSI-RS) used for measurement of channel states. It is preferred that the CSI-RSs are mutually orthogonal between antenna elements or between antenna ports.

In the calibration system, a combiner 16 receives and combines in phase downlink transmission signals monitored at the respective monitors 15. The combined downlink signal passes through a filter 17 adapted to pass only downlink signals, and is attenuated at an attenuator 18 to the dynamic range or the receiving system. Then the combined radio frequency (RF) signal is converted to a baseband signal at an RF receiving circuit 19. After removal of a cyclic prefix, the baseband signal undergoes fast Fourier transform (FFT) at an FFT block 20. The output of the FFT block 20 is connected to input of a reference signal detector 21, at which a reference signal is detected from the monitored downlink signal. The detected reference signal is used for channel estimation at a channel estimator 22. The channel estimator 22 estimates a channel for each of the antennas 11. The channel estimation values of the respective antennas 11 are supplied to a calibration controller 23.

The calibration controller 23 calculated phase and/or amplitude correction values for calibrating the respective antennas 11 based upon the channel estimation values. The correction values May be named "calibration values". The calibration values are supplied to an antenna element/port controller 40, and the phase and the amplitude of a downlink signal supplied to each of the antennas 11 are adjusted.

A downlink reference signal is input, together with transmission data having been subjected to channel coding and data modulation, to a subcarrier mapper 32. The reference signal is mapped to subcarriers and OFDM symbols such that reference signals are mutually orthogonal between antennas 11. The orthogonalization of reference signals between antennas 11 may be carried out using an orthogonal set of codes.

The mapped transmission signal is multiplied by precoding weights at a precoding multiplier 33. The calibration values are applied to the precoded transmission signal, and the calibrated signal is distributed to the associated transmission lines. On each of the transmission lines, inverse fast Fourier transform (IFFT) is performed at a IFFT block 12, a cyclic prefix is added, and frequency conversion to a radio frequency is performed on the transmission signal at an RF transmission circuit 13. The RF signal is supplied via a duplexer 14 to the associated antenna 11. A portion of the RF signal to be supplied to the antenna 11 is output from the associated monitor 15 to the combiner 16.

Regarding the uplink, a signal received at each of the antennas 11 is input to a corresponding one of RF receiving circuits 39-1 to 39-m, and supplied to a signal detector 25 after removal of cyclic prefix and fast Fourier transform (although not illustrated). A channel estimator 26 estimates a data channel using a reference signal for data channel estimation detected at the signal detector 25. The channel estimator 26 also estimates a control channel using a reference signal for control channel estimation. Data demodulator 27 demodulates a data channel using data channel estimation values, and outputs received data. A control channel demodulator 28 demodulates a control channel using control channel estimation values. A CSI updating block 29 takes channel state information (CSI) out of the demodulated control channel and updates the CSI. Ab antenna port configuration determination block 30 controls antenna configuration, such as using the respective antennas 11 as individual antenna ports or grouping antennas 11 into groups to use the respective groups as antenna ports, based upon the updated channel state information. In the first embodiment, the antenna configuration is controlled in the state in which the respective antennas 11 are used as individual antenna ports. The antenna port configuration determination block 30 determines precoding vector based upon the updated CSI and supplies the precoding vector to a precoding weight controller 31.

Figure 2:
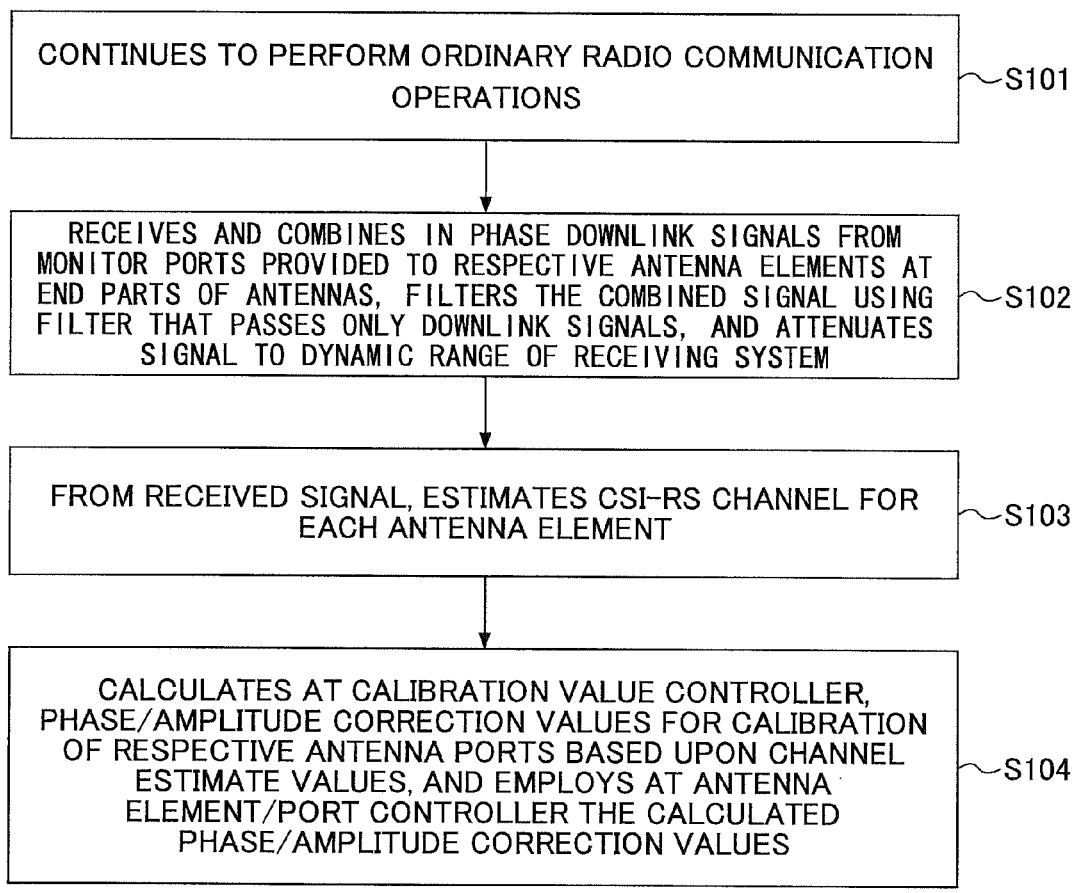
FIG. 2 is a flowchart of a calibration method according to the first embodiment.

FIG. 2 is a flowchart of a calibration method performed by the base station apparatus 1 according to the first embodiment. The base station apparatus 1 continues to perform ordinary radio communication operations (S101). Accordingly, mapping of transmission data and CSI-RS to subcarriers, combining of downlink transmission signals, and distribution of transmission data to antennas 11 are carried out. Each of the antennas 11 corresponds to an antenna element and to an antenna port in this example.

The downlink signal is transmitted from each of the antennas (or antenna elements) 11. Simultaneously, portions of the downlink signals to be transmitted are monitored at the monitors (or monitor ports) 15 provided to the respective antennas 11, supplied to the combiner 16 and combined in phase. The combined signal passes through a filter that passes only downlink signals, and is attenuated to the dynamic range of the receiving system (S102).

Then, a CSI-RS channel is estimated for each antenna (or antenna element) 11 from the received signal (S103).

The calibration value controller 23 calculate phase/amplitude correction values as calibration values for calibrating antennas 11-1 to 11-m based upon channel estimation values. The antenna element/port controller 40 applies the calibration values (S104).

In the first embodiment, an existing reference signal is used for calibration, and downlink signals containing the reference signal monitored at the monitor ports 15 provided to the respective antenna elements are received and combined in phase. Calibrations values are determined from channel estimation values of the reference signal for the respective antenna elements based upon the combined signal. Consequently, even if the number of antenna elements increases, calibration is performed appropriately while preventing the amount of computation from increasing.

<Second Embodiment>

Figure 3:
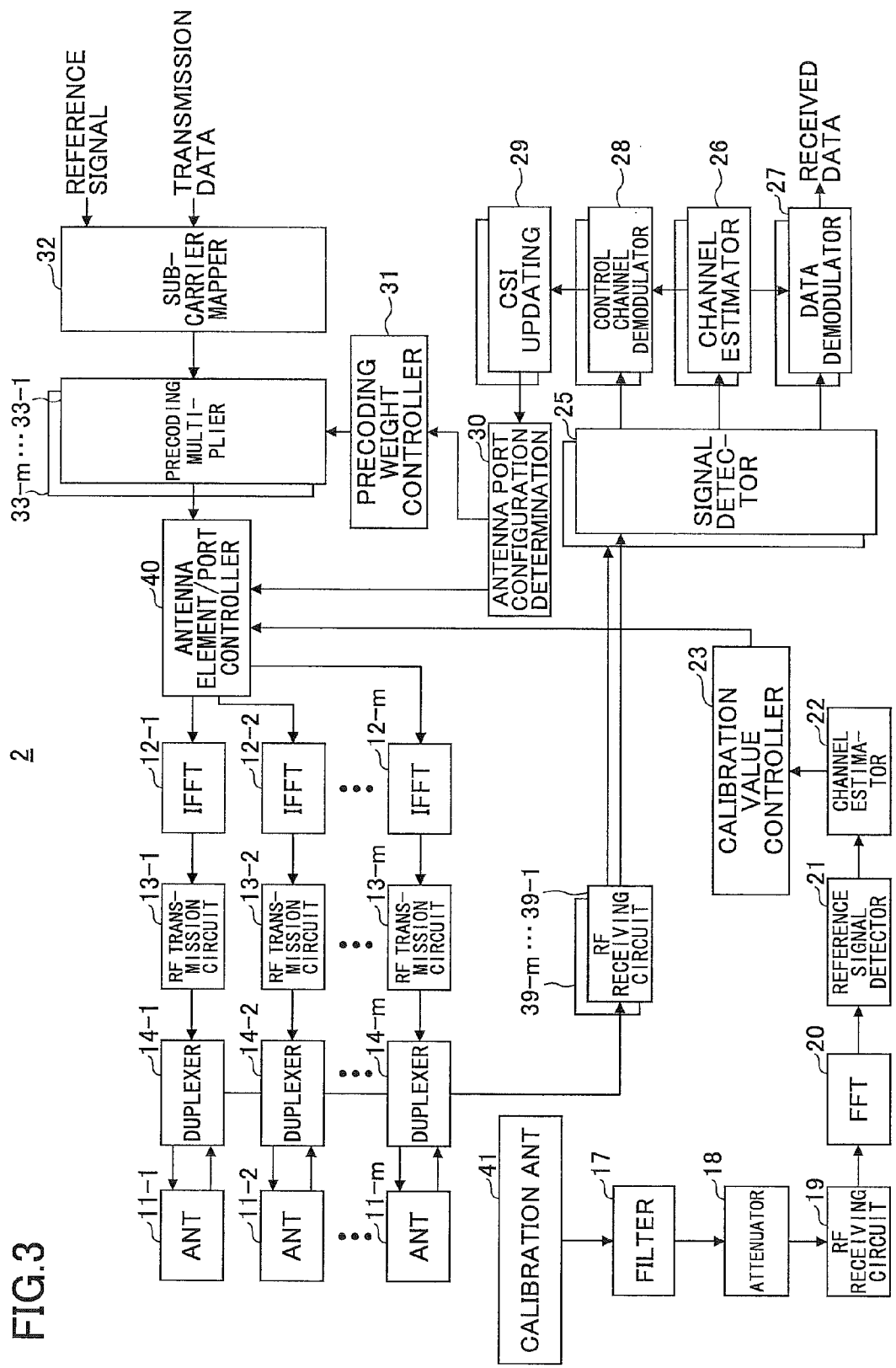
FIG. 3 is a schematic diagram of a base station apparatus according to the second embodiment.

FIG. 3 is a schematic diagram of a base station apparatus 2 according to the second embodiment. The same elements as those of the base station apparatus 1 of the first embodiment are denoted by the same numerical symbols, and redundant explanation for them is omitted.

The base station apparatus 2 of the second embodiment has a calibration antenna 41, in addition to antennas 11-1 to 11-m. The calibration antenna 41 receives electromagnetic radiation emitted from the respective antennas 11. Channel information between the calibration antenna 41 and each of the antennas 11 is measured in advance.

The downlink signal received at the calibration antenna 41 passes through the filter 17 that allows only downlink signals to pass through. The filtered signal is attenuated at the attenuator 18 and input to the RE receiving circuit 19. The reference signal detector 21 detects the reference signal from the downlink signal that has been converted to a baseband signal and subjected to fast Fourier transform at the FFT block 20. The reference signal is, for example, CST-RS, and it is preferred that the CST-RS is orthogonalized between antennas 11.

The channel estimator 22 carries out channel estimation for each of the antennas 11 based upon the detected reference signal. The calibration controller 23 calculates calibration values for correcting phase and amplitude of signals supplied to the antennas 11 based upon the output of the channel estimator 22. The calculated calibration values are supplied to the antenna element/port controller 40, at which the phase and the amplitude of the downlink signals to be supplied to the respective RF transmission lines are controlled using the calibration values.

Figure 4:
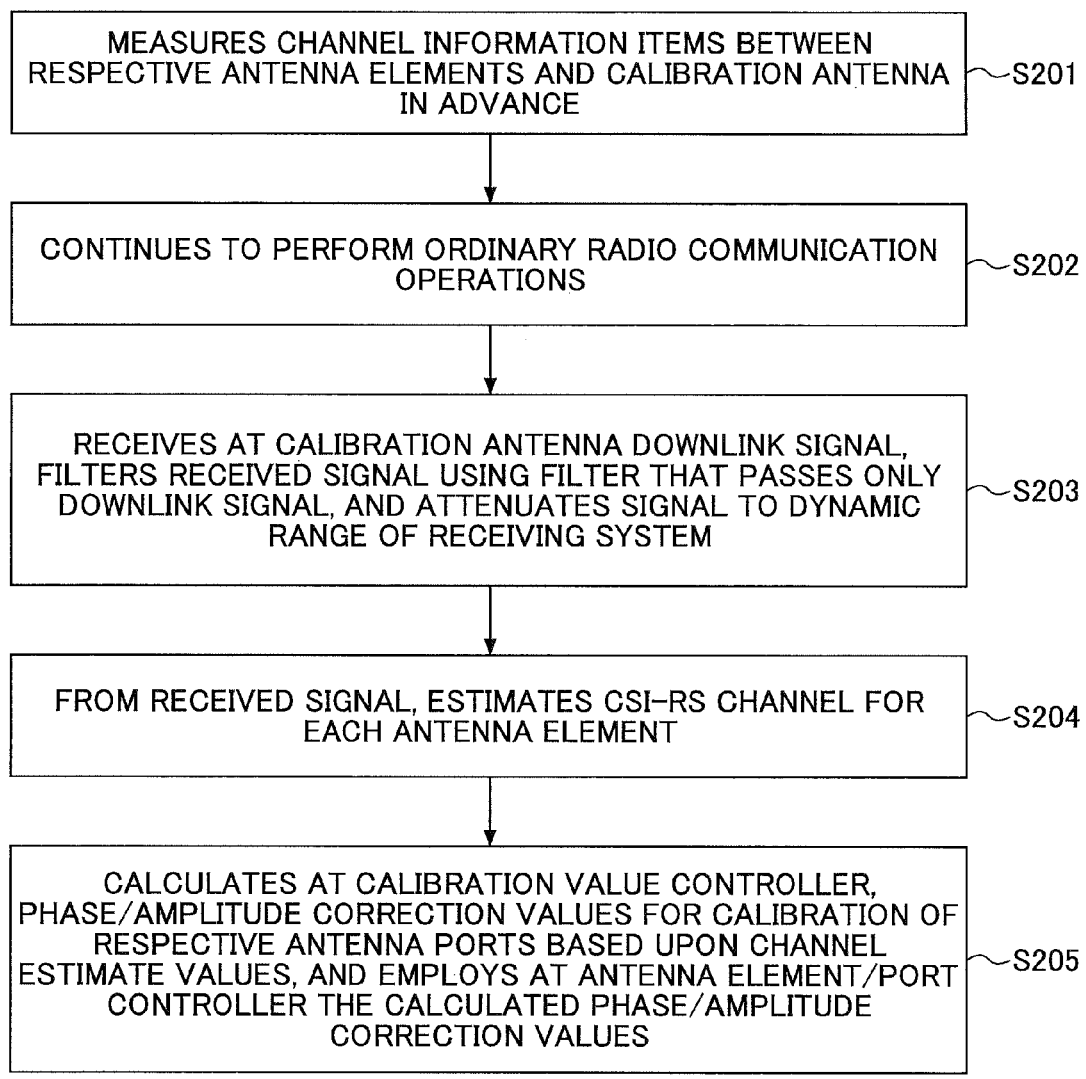
FIG. 4 is a flowchart of a calibration method according to the second embodiment.

FIG. 4 is a flowchart of a calibration method according to the second embodiment. First, channel information between the calibration antenna 41 and the respective antennas 11-1 to 11-m is measured in advance (S201). The base station apparatus 2 continues to perform ordinary radio communication operations (S202). Streams of the downlink signal mapped to subcarriers and multiplied by precoding weights are transmitted from the respective antennas 11 and received at the calibration antenna 41. The received signal passes through a filter that allows only downlink signals to pass, and the filtered signal is attenuated to the dynamic range of the receiving system (S203).

From the received downlink signal, a channel of the reference signal (e.g., CST-RS) is estimated for each of the antennas 11 (S204). At the calibration controller 23, phase/amplitude correction values are calculated as calibration values for calibration of the antennas 11 from the respective channel estimation values. The calibration values are applied to the downlink signal streams to be supplied to the respective antennas 11 at the antenna element/port controller 40 (S205).

The structure and method of the second embodiment can achieve more accurate calibration because overall influence in the multiple antenna mounted state is taken into account.

<Third Embodiment>

Figure 5:
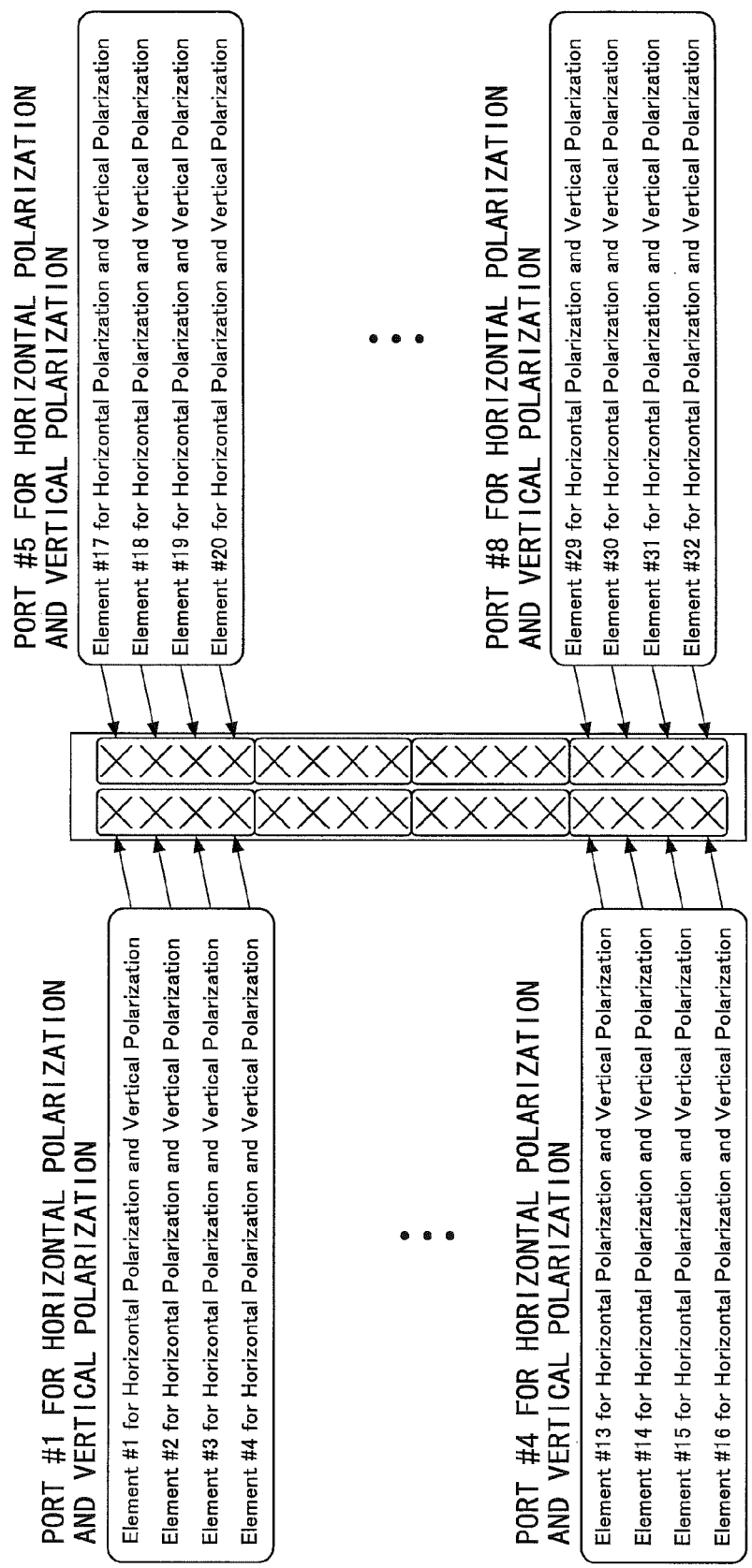
FIG. 5 illustrates an example of antenna configuration in which each antenna port is formed of a group of antenna elements.
Figure 6:
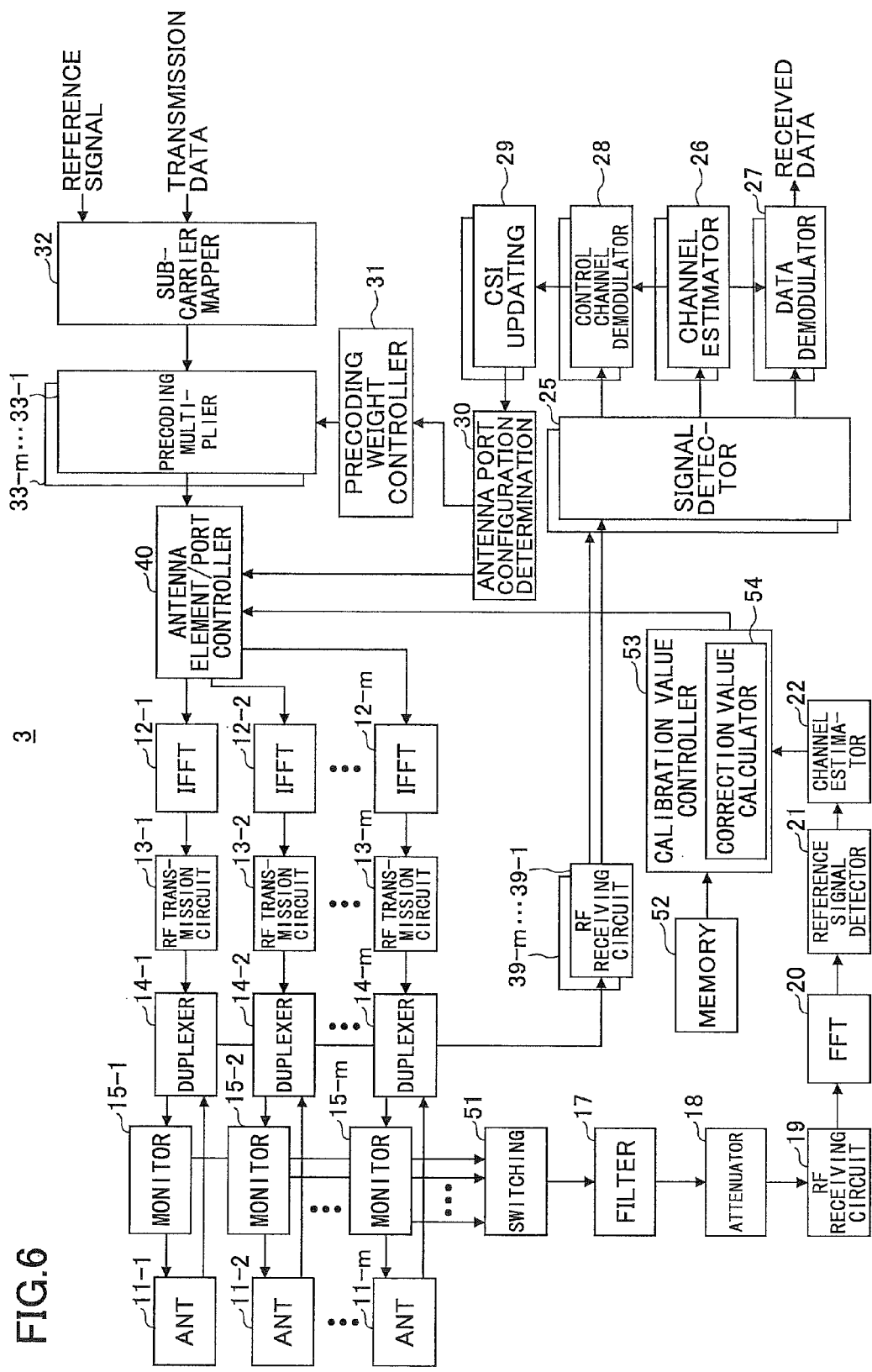
FIG. 6 is a schematic diagram of a base station apparatus according to the third embodiment.
Figure 7:
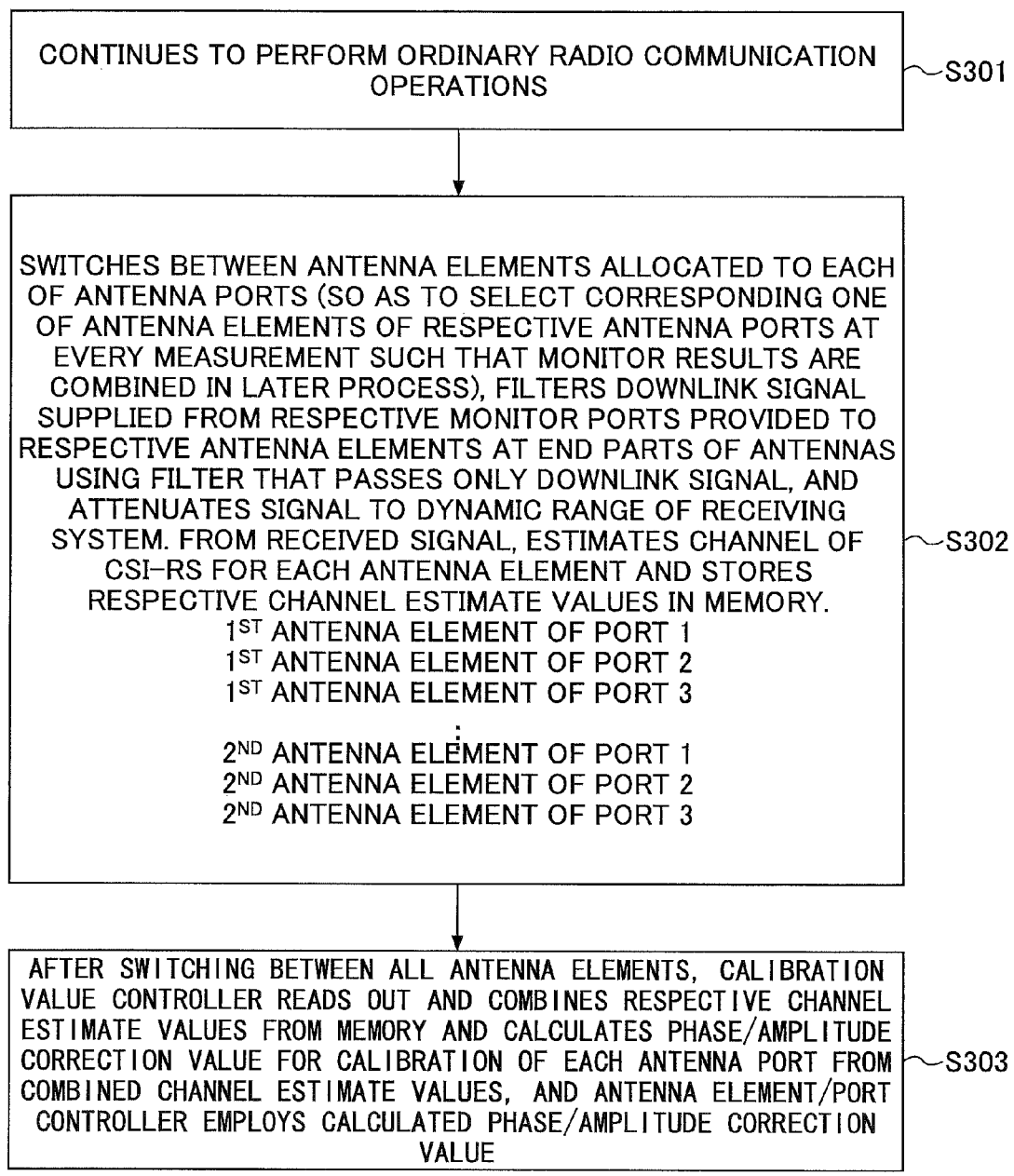
FIG. 7 is a flowchart of a calibration method according to the third embodiment.

FIG. 5 through FIG. 7 illustrate a calibration technique according to the third embodiment. In the third embodiment, calibration is applied to a configuration in which two or more antennas (or antenna elements) 11 are allocated to an antenna port, in other words, a configuration in which an antenna port is formed of two or more antennas (antenna elements) 11.

As illustrated in FIG. 5, a plurality of antenna elements are grouped appropriately to form antenna ports. With this scheme, an appropriate antenna configuration can be employed in accordance with the radio communication environment, antenna correlation, communicating schemes, the number of users multiplexed, or the rank.

For example, in FIG. 5, the total of 64 antenna elements with 16 lines, 2 columns, and two polarizations, are used. Antenna elements #1 to #4, each element configured to handle horizontally polarized wave and vertically polarized wave, form an antenna port #1. Similarly, every four antenna elements, each capable of treating horizontally polarized wave and vertically polarized wave, form a group, and the total of eight antenna ports (ports #1 to #8) are produced. The antenna configuration of FIG. 5 is only an example, and other antenna configurations may be produced by differently grouping the antenna elements. In this case, calibration between antenna elements included in the same antenna group is required, in addition to calibration between antenna ports.

FIG. 6 is a schematic diagram of a base station apparatus 3 according to the third embodiment. The same elements as those of the base station apparatuses 1 and 2 of the first and the second embodiments are denoted by the same numerical symbols, and redundant explanation for them is omitted.

The base station apparatus 3 of the third embodiment has a switching block 51 that switches between outputs from the monitors 15-1 to 15-m in turn, a channel estimator 22 that estimates channels of the reference signal for the respective antennas 11-1 to 11-m, and a memory 52 that stores channel estimation values for the respective antennas 11. More detailed description will be made to the switching between the outputs of the monitors 15 and storing of the channel estimation values in the memory 52 below.

The base station apparatus 3 also has a calibration value controller 5 that calculates calibration values for the respective antennas from the channel estimation values stored in the memory 52, and an antenna element/port controller 40 that applies calibration values to the streams of the transmission signal to be supplied to the respective antennas 11. The calibration value controller 53 has a correction value calculator 54 that carries out composite calculation on the channel estimation values stored in the memory 52 to determine phase/amplitude correction values for calibration of antennas 11. The antenna element/port controller 40 applies the calibration values (phase/amplitude correction values) to the signal streams to be supplied to the antennas 11, while grouping the antennas 11 so as to form antenna ports according to the antenna configuration determined by the antenna port configuration determination block 30.

FIG. 7 illustrates a control flow performed by the base station apparatus 3. System continues to perform ordinary radio communication operations (S301). The switching block 51 switches between the outputs of the monitors 15 for associated antenna elements (or antennas 11) allocated to each antenna port. After filtering at the filter 17 and attenuation at the attenuator 19, channel estimation values of the reference signal for the respective antennas 11 are stored in the memory 52 (S302).

Switching is performed so as to select corresponding antenna elements in turn among the antenna ports. For example, referring to FIG. 5, antenna element #1 of port #1, the antenna element #5 (that corresponds to antenna element #1) of port #2, the antenna element #9 (that corresponds to antenna element #1) of port #3, . . . , are elected in turn. Then, the antenna element #2 of port #1, the antenna element #6 (that corresponds to antenna element #2) of port #2, the antenna element #10 (that corresponds to antenna element #2) of port #3, . . . , are elected in turn.

Returning back to FIG. 7, after switching between all the antenna elements (antennas 11), the channel estimation values of a group of corresponding antenna elements among the antenna ports are read out of the memory 52 and combined to determine correction values (S303). For example, the channel estimation values of the first antenna element of the respective antenna ports are read out and combined to calculate correction values for the first antenna elements of the antenna ports. Then, the channel estimation values of the second antenna elements of the respective antenna ports are read out of the memory 52 and combined to calculate correction values for the second antenna elements of the antenna ports. Similar process is repeated until the correction values for the last antenna elements of the respective antenna ports are calculated.

The structure and method of the third embodiment can achieve efficient calibration between antenna ports even if antenna elements are grouped into multiple antenna ports.

<Fourth Embodiment>

The calibration technique of the fourth embodiment is also suitable to calibration when two or more antenna elements (or antennas 11) are allocated to each of the antenna ports.

Figure 8:
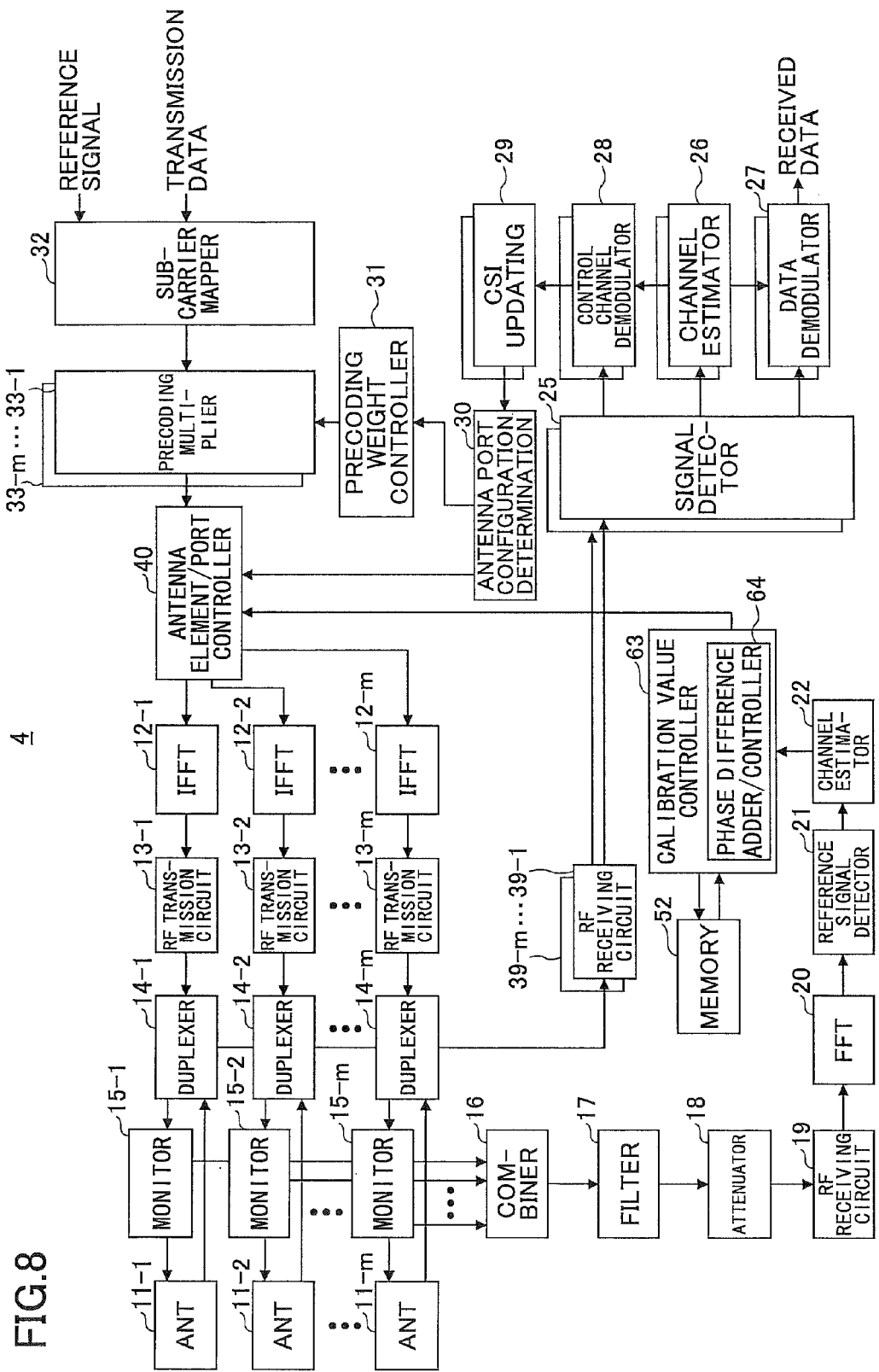
FIG. 8 is a schematic diagram of a base station apparatus according to the fourth embodiment.

FIG. 8 is a schematic diagram of a base station apparatus 4 according to the fourth embodiment. The same elements as those of the base station apparatuses 1 to 3 of the first through the third embodiments are denoted by the same numerical symbols, and redundant explanation for them is omitted.

An the base station apparatus 4, a calibration value controller 63 has a phase difference adder/controller 64. The phase difference adder/controller 64 adds a phase difference to every antenna element (i.e., antenna 11) included in an antenna port on the element by element basis, and a phase rotation quantity that maximize the channel estimation value is determined. This process is performed on the respective antenna ports. The phase differences that maximize channel estimation values are stored in a memory 62.

The downlink signal streams to which phase differences have been added are monitored at the monitors 15-1 to 15-m provided to the respective antennas 11-1 to 11-m at the end parts of the antennas 11. The monitored components are received and combined in phase at the combiner 16. After filtering at the filter 17, attenuation at the attenuator 18, frequency conversion at the RF receiving circuit and Fourier transform at FFT block 20, the reference signal is detected from the monitored downlink signal and channels of the reference signal are estimated by the channel estimator 22 for the respective antennas 11.

Different values of phase difference are input subsequently to the antenna element/port controller 40 from the phase difference adder/controller 64 of the calibration value controller 63. The channel estimator 22 calculates a channel estimation value at every phase rotation quantity for each of the antennas 11.

The calibration value controller 63 determines and stores a phase rotation quantity that maximizes the channel estimation value in the memory 62. When the phase rotation quantities that maximize the channel estimation values have been determined for all the antenna ports, a set of calibration values are determined for each of the antenna ports. The determined calibration values are supplied to the antenna element/port controller 40.

Figure 9:
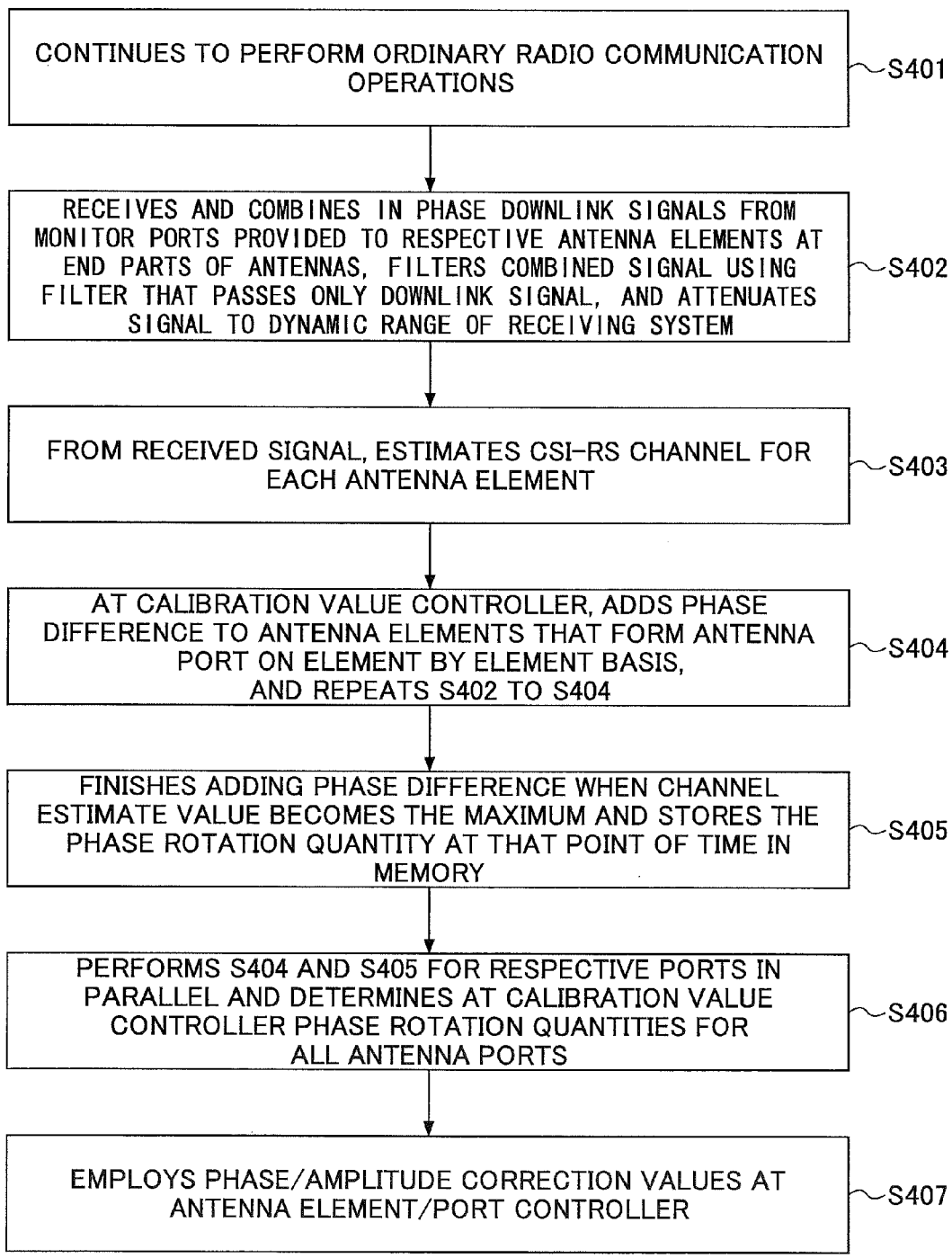
FIG. 9 is a flowchart of a calibration method according to the fourth embodiment.

FIG. 9 illustrates a control flow performed by the base station apparatus 4. The system continues to perform ordinary radio communication operations (S401). The downlink signal streams supplied form the monitors 15-1 to 15-m are received and combined in phase. The combined signal is filtered by a filter adapted to pass only downlink signals, and attenuated to the dynamic range of the receiving system (S402). A channel of a reference signal (such as CST-RS) is estimated for each of the antenna elements (antennas 11) from the received signal (S403).

At the calibration value controller 63, a phase difference is added to every antenna element included in an antenna port for each of the antenna ports (S404). Steps S402 to S404 are repeated until the phase differences that maximize channel estimation values have been determined for the antenna elements of each antenna port, and the determined phase rotation quantities are stored in the memory (S405). The steps S404 and S405 are performed for all the antenna ports in parallel to determine phase rotation quantities of all the antenna ports (S406). The antenna element/port controller 40 employs calibration values (Phase/amplitude correction values) determined by the calibration value controller 63 (S407).

In the fourth embodiment, by adding a phase difference sequentially, calibration is made using phase rotation quantities that maximize the channel estimation values of the respective antenna elements for each of the antenna ports. Besides, by adding the phase difference, the reference signals can be distinguished from each other between antenna elements included in the same antenna port.

<Fifth Embodiment>

The fifth embodiment is also suitable to calibration when two or more antenna elements (or antennas 11) are allocated to each of the antenna ports. In the previous (fourth) embodiment, a phase difference is added to every antenna element included in an antenna port. In the fifth embodiment, a random phase difference is added to every antenna element included in each antenna port.

Figure 10:
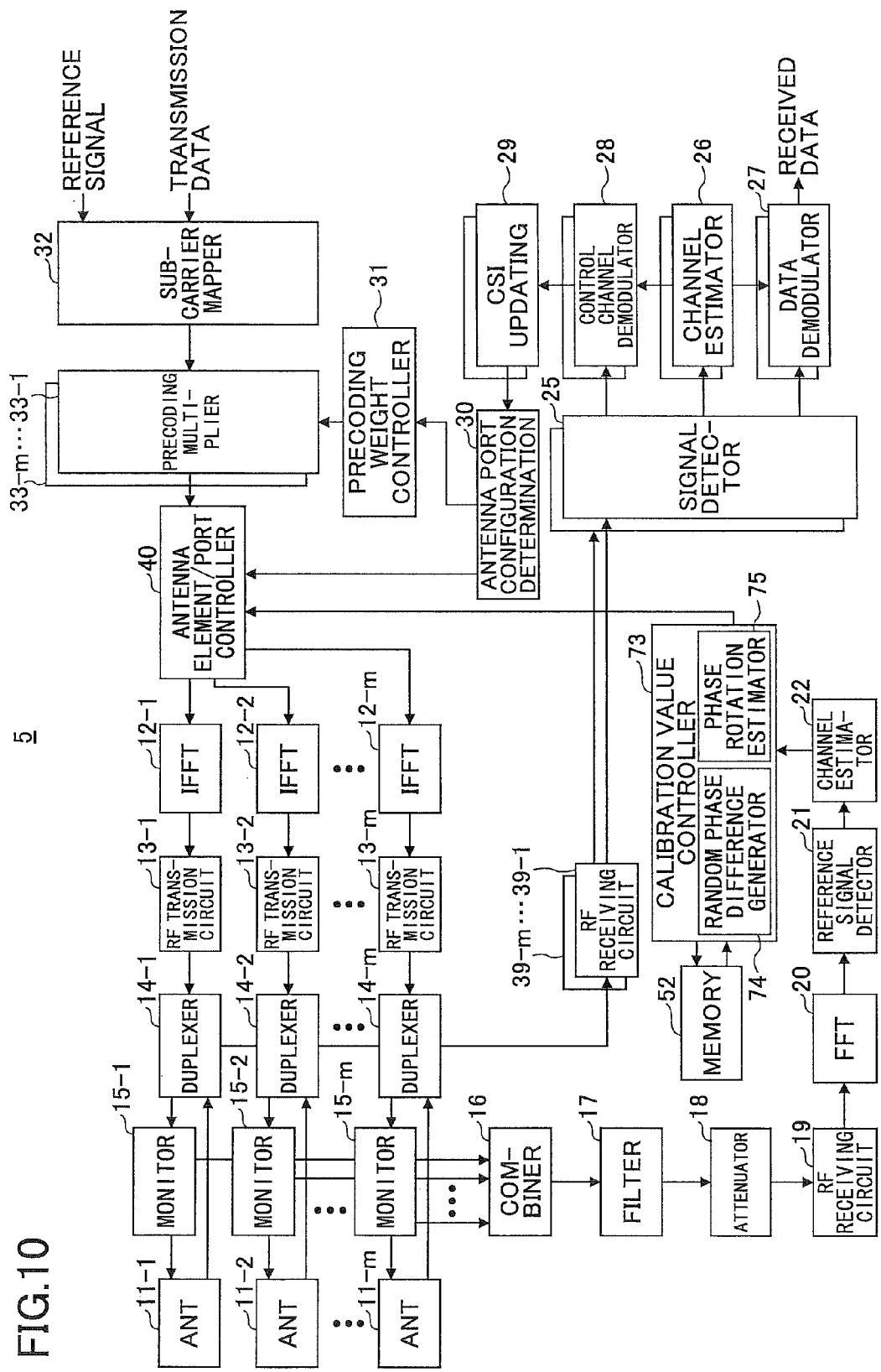
FIG. 10 is a schematic diagram of a base station apparatus according to the fifth embodiment.

FIG. 10 is a schematic diagram of a base station apparatus 5 according to the fifth embodiment. The same elements as those of the base station apparatuses 1 to 4 of the first through the fourth embodiments are denoted by the same numerical symbols, and redundant explanation for them is omitted.

At the base station apparatus 5, a calibration value controller 73 has a random phase difference generator 74 and a phase rotation estimator 75. The random phase difference generator 74 generates and adds random phase differences to the antenna elements included in each of the antenna ports. These phase quantities are stored in a memory 72.

The downlink signal streams to which random phase differences have been added are monitored by the monitors 15-1 to 15-m provided to the respective antennas 11-1 to 11-m at the end parts of the antennas 11. Monitored components are received and combined in phase at the combiner 16. After filtering at the filter 17, attenuation at the attenuator 18, frequency conversion at the FR receiving circuit 19 and Fourier transform at the FFT 20, a reference signal is detected from the monitored downlink signal. At the channel estimator 22, a channel of the reference signal is estimated for each of the antennas 11. Adding of a random phase difference and the channel estimation at that phase rotation quantity are repeatedly carried out.

The phase rotation estimator 75 estimates a current phase rotation at each of the antenna elements (or antennas 11) for each antenna port, based upon the relationship between the phase rotation quantities and the channel estimation values, and determines calibration values supplied to the antenna element/port controller 40 based upon the estimated phase rotation quantities.

Figure 11:
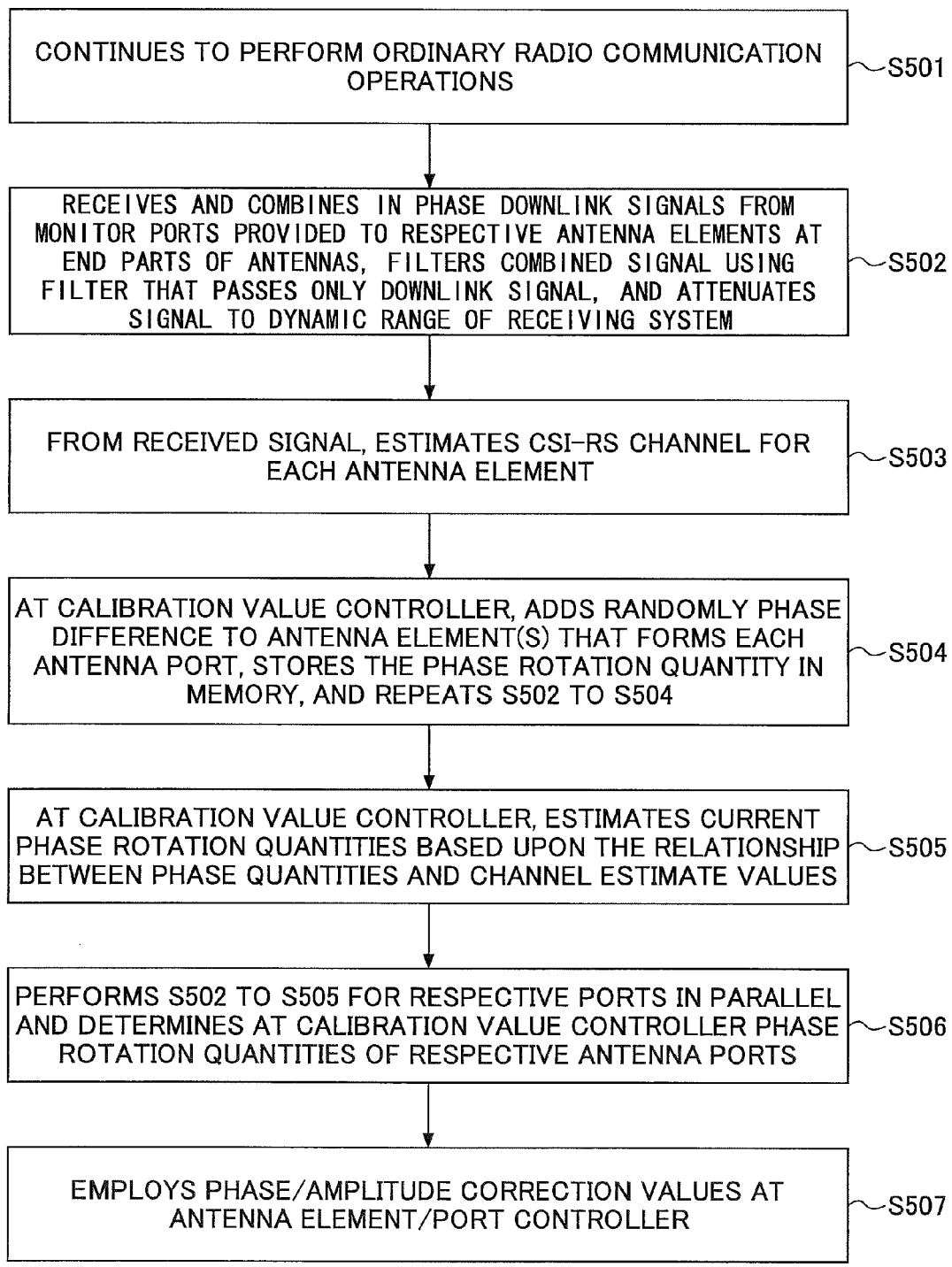
FIG. 11 is a flowchart of a calibration method according to the fifth embodiment.

FIG. 11 illustrates a control flow performed by the base station apparatus 5. The system continues to perform ordinary radio communication operations (S501). The downlink signal streams supplied from the respective monitors 15-1 to 15-m are received and combined in phase. The combined signal is filtered by a filter adapted to pass only downlink signals, and attenuated to the dynamic range of the receiving system (S502). From the received signal, a channel of the reference signal (such as CST-RS) is estimated for each of the antenna element (S503).

At the calibration value controller 73, a random phase difference is added to each of the antenna elements included in each antenna port, and the corresponding phase rotation quantities are stored in the memory 72 (S504). Steps S502 to S504 are repeated multiple times (S505).

At the calibration value controller 73, the current phase rotations at the respective antenna elements are estimated based upon the relationship between the phase rotation quantities and the channel estimation values (S506). Steps S502 through S505 are performed in parallel among the multiple antenna ports to determine calibration values for each of the antenna ports (S507). The antenna element/port controller 40 employs the determined calibration values (S508).

In the fifth embodiment, by adding random phase difference among the antenna elements that form each of the antenna ports, calibration values for the respective antenna elements can be determined for each of the antenna ports. By adding random phase differences, the reference signals can be distinguished from each other between the antenna elements included in the same antenna port.

<Sixth Embodiment>

In the sixth embodiment, calibration is efficiently performed by controlling switching operations between outputs of the monitors 15-1 to 15-m provided to the respective antennas 11-1 to 11-m at the end part of the antennas. In this embodiment, each of the antennas 11 corresponds to an antenna element, and an antenna port is formed of a single antenna element.

Figure 12:
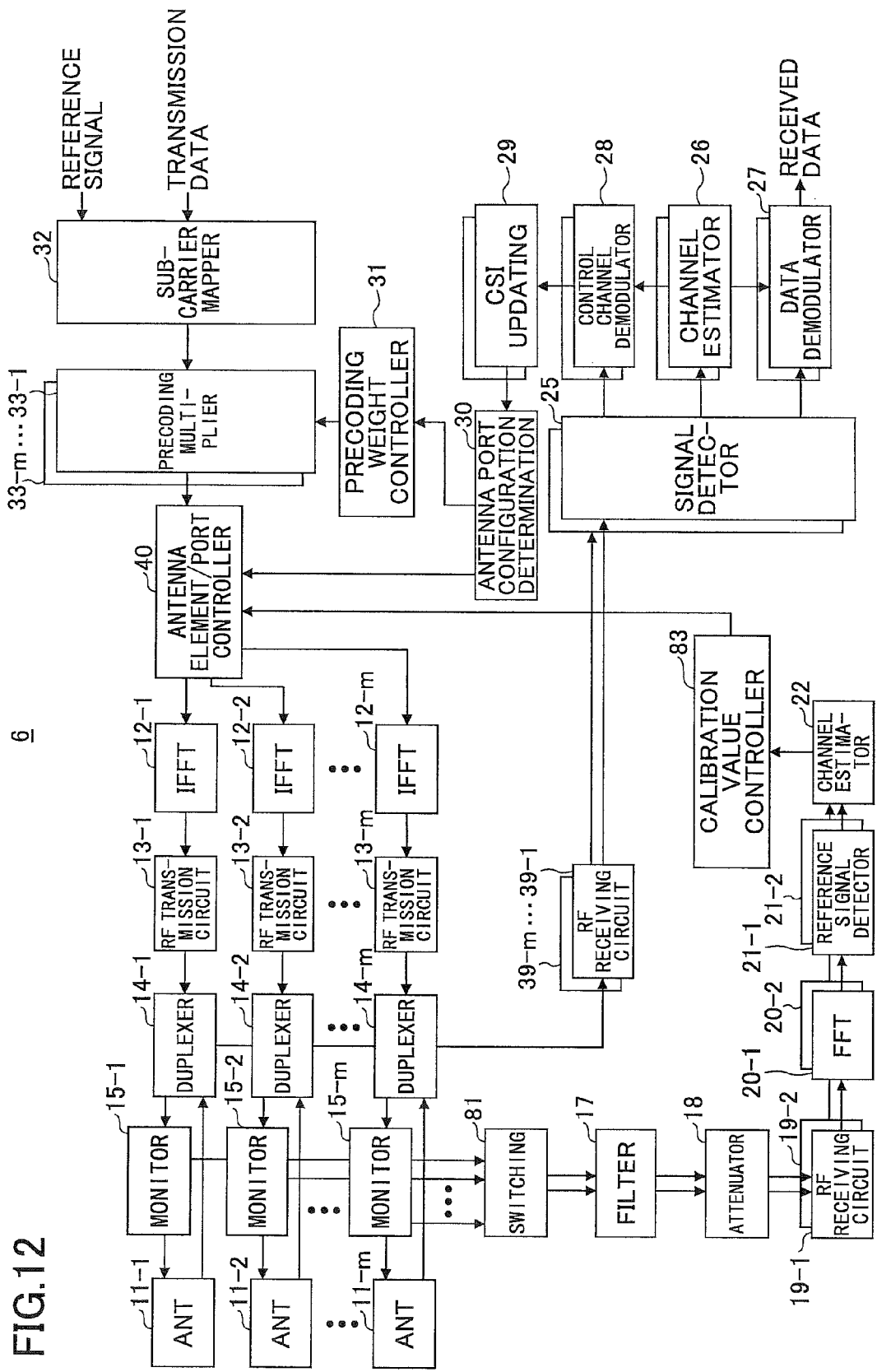
FIG. 12 is a schematic diagram of a base station apparatus according to the sixth embodiment.

FIG. 12 is a schematic diagram of a base station apparatus 6 according to the sixth embodiment. The same elements as those of the base station apparatuses 1 to 5 of the first through the fifth embodiments are denoted by the same numerical symbols, and redundant explanation for them is omitted.

The base station apparatus 6 has a switching block 81 that selects two of the outputs from the monitors 15-1 to 15-m, two lines of receiving systems provided for the selected outputs, a channel estimator 22, and a calibration value controller 83.

The switching block 81 selects an output from a monitor 15 provided for the reference antenna 11 and an output from one of the other monitors 15 provided for the other antennas 11. The outputs from the other monitors 15 are selected in turn. For example, switching is performed to select a pair of port 1 and port 2, a pair of port 1 and port 3, a pair of port 1 and port 4, . . . , subsequently. With this arrangement, the phases and amplitudes of the downlink signal streams transmitted from all the antennas 11 can be monitored under the same relationship with respect to the reference antenna.

Corresponding to the two selected monitor outputs, RF receiving circuits 19-1 and 19-2, FFT blocks 20-1 and 20-2, and reference signal detectors 21-1 and 21-2 are provided. The channel estimator 22 estimates channels of the reference signals for the currently selected antennas 11. A calibration value controller 83 determines the calibration values for the other antennas based upon the relation with respect to the reference antenna 11.

Figure 13:
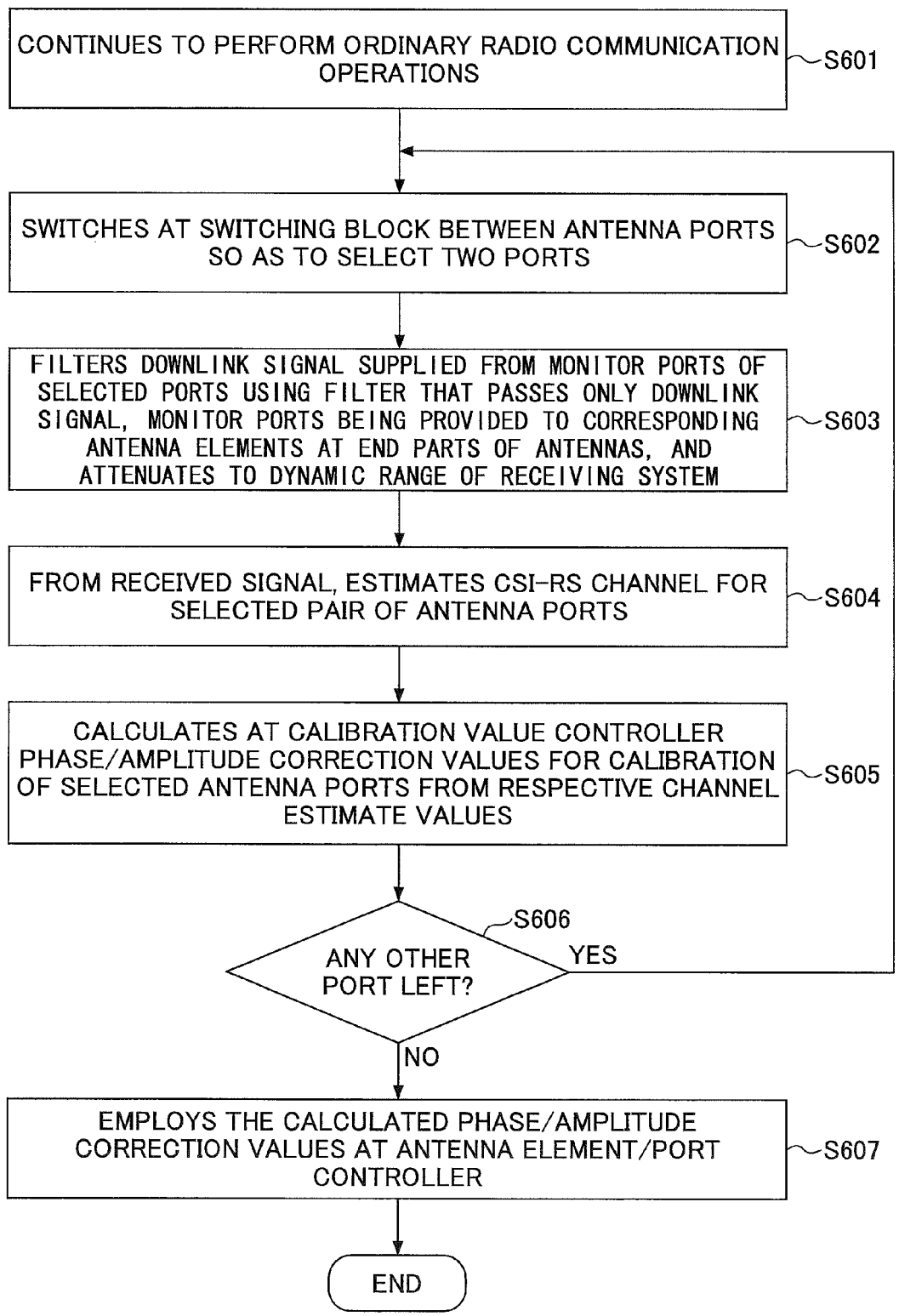
FIG. 13 is a flowchart of a calibration method according to the sixth embodiment.

FIG. 13 illustrates a control flow performed by the base station apparatus 6. The system continues to perform ordinary radio communication operations (S601). Switching is performed between outputs from the monitors 15 so as to select an output from the monitor 15 provided for the reference antenna 11 and one of the outputs from the other monitors 15 provided for the other antennas 11 (S602).

The downlink signal streams from the two selected monitors 15 are filtered at filters that passes only downlink signals, and attenuated to the dynamic range of the associated receiving systems (S603).

From the received signal components, a channel of the reference signal (such as a CSI-RS) is estimated for each of the selected antenna ports, namely, antennas 11 (S604).

The calibration value controller 83 determines a correction value for calibration for the focused-on antenna port 11 based upon the respective channel estimation values (S605). The calibration value controller 83 determines whether there is any other antennas 11 left to pair with the reference antenna 11 (S607), and repeats S602 through S605 until all the other antennas 11 have been selected. When the calibration values have been determined for all the antennas 11, the antenna element/port controller 40 employs the determined calibration values (S607).

In the sixth embodiment, by sequentially switching between pairs of the reference antenna 11 and other antennas to perform channel estimation, efficient calibration is achieved even if the number of antennas 11 increases.

<Seventh Embodiment>

In the seventh embodiment, known reference signals that are mutually orthogonal between antennas are transmitted at a timing when no transmission data are sent, and calibration values are calculated based upon the reference signals.

Figure 14:
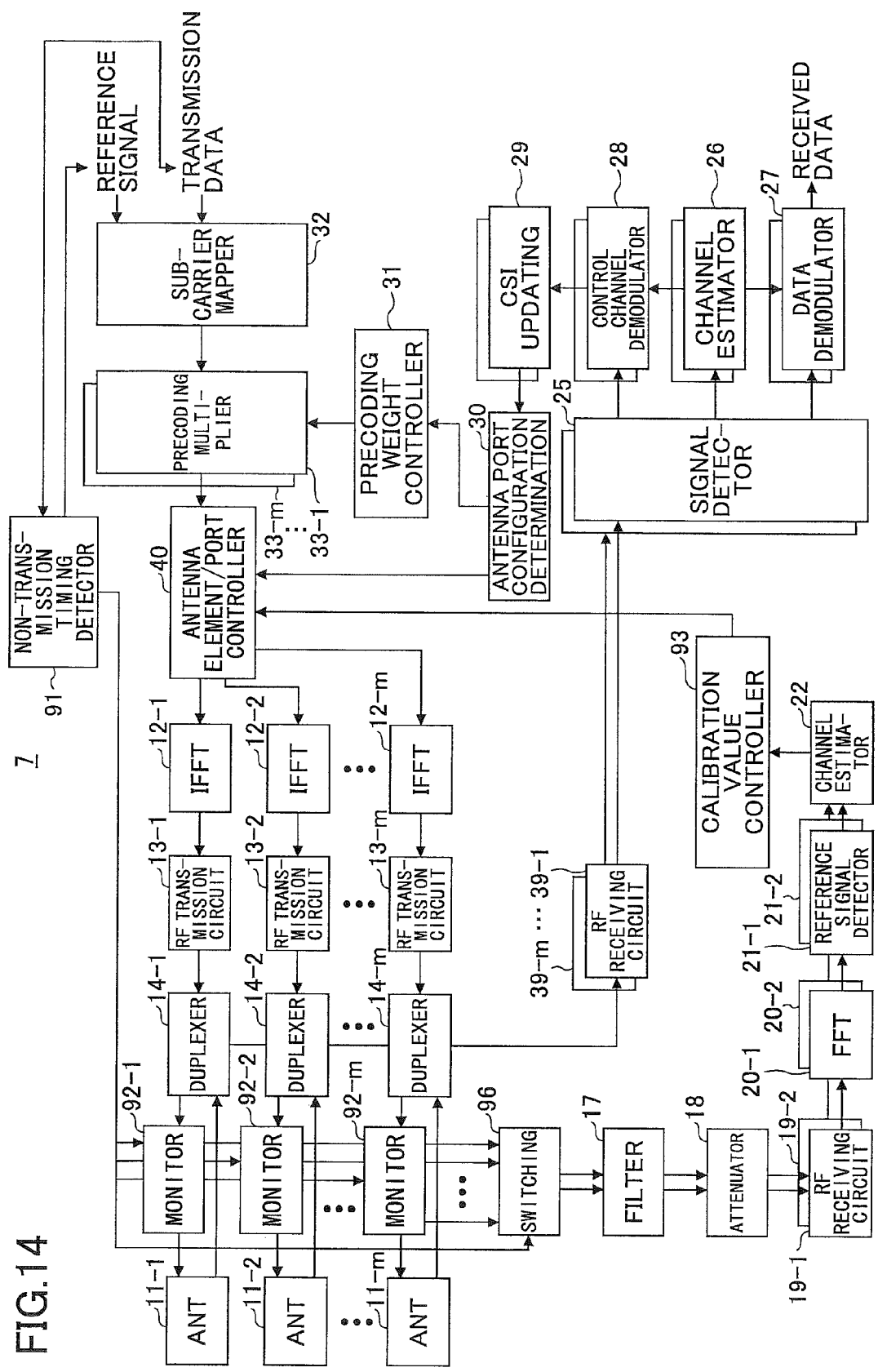
FIG. 14 is a schematic diagram of a base station apparatus according to the seventh embodiment.

FIG. 14 is a schematic diagram of a base station apparatus 7 according to the seventh embodiment. The base station apparatus 7 has a non-transmission timing detector 91, and a monitors 92-1 to 92-m provided for the respective antennas 11-1 to 11-m. the non-transmission timing detector 91 detects a timing at which no data are transmitted, and supplies a switching signal to the monitors 92-1 to 92-2 based upon the detection result. The monitors 92-1 to 92-m switches the output direction of the downlink signal from the antennas 11-1 to 11-m to a calibration receiving system.

The outputs of the respective monitors 92-1 to 92-m are connected to inputs to a switching block 96. Synchronizing with the switching signal from the non-transmission timing detector 91, the switching block 96 selects a pair of the output from the monitor 92 provided for the reference antenna 11 and one of the outputs from the other monitors 92 provided for the other antennas 11, as in the sixth embodiment. The two selected outputs are supplied to the filter 17.

The two selected outputs pass through the filter 17 adapted to pass only downlink signals, and are attenuated at the attenuator 18 to the dynamic range of the associated receiving systems. The outputs from the attenuator 18 are subjected to the processes at the RF receiving circuits 19-1 and 19-2, FFT blocks 20-1 and 20-2, and the reference signal detectors 21-1 and 21-2. Then, channels of the reference signals for the selected pair of the antennas 11 are estimated at the channel estimator 22. The switching and selection of the pair of antennas 11 at the switching block 96 and the channel estimation for the associated antennas 11 at the channel estimator 22 are repeated within the time period in which no transmission data are sent.

A calibration value controller 93 determines phase/amplitude correction values for calibration for the respective antennas 11 (i.e., antenna elements or antenna ports) based upon the outputs from the channel estimator 22. The correction values are supplied as calibration values to the antenna element/port controller 40.

Figure 15:
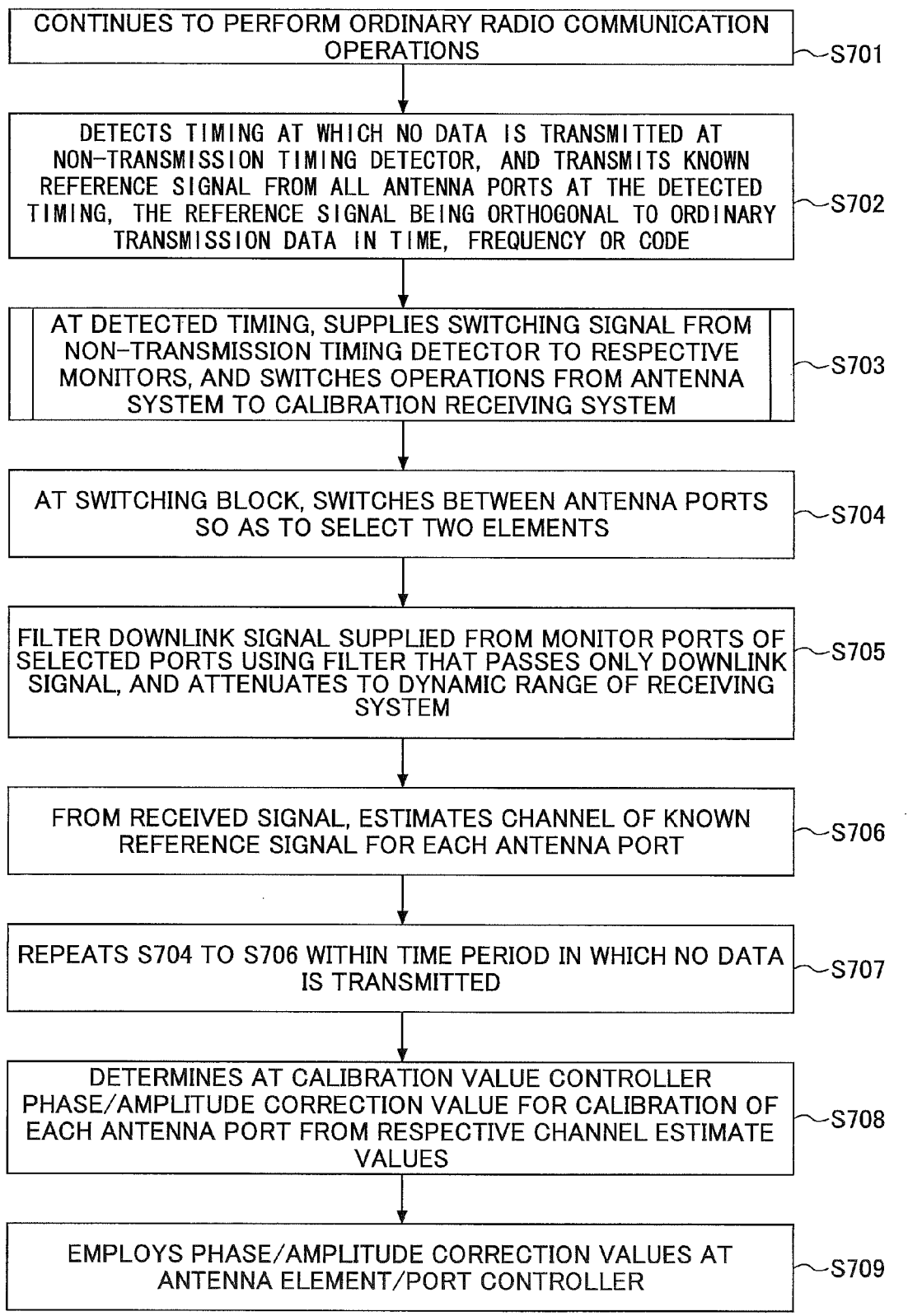
FIG. 15 is a flowchart of a calibration method according to the seventh embodiment.

FIG. 15 illustrates a control flow performed by the base station apparatus 7. The system continues to perform ordinary radio communication operations (S701). A timing at which no data are transmitted is detected at the non-transmission timing controller 91. At the detected timing, a known reference signals orthogonal in time, frequency or code is transmitted from all the antennas (or antenna ports) 11 at the resource positions of the ordinary transmission data (S702).

At the detected timing, a switching signal is supplied from the non-transmission timing detector 91 to the monitors 92-1 to 92-m. The monitors 92-1 to 92-m monitor the downlink signal streams according to the switching signal and output the monitoring results to the calibration system (S703).

At switching block 96, according to the switching signal from the non-transmission timing detector 91, an output of the monitor 92 provided for the reference antenna 11 and an output from one of the other monitors provided for the other antennas 11 are selected from among the outputs of the monitors 92-1 to 92-m (S704). The downlink signal components monitored at the two selected monitors are filtered at the filter adapted to pass only downlink signals, and attenuated to the dynamic range of the receiving system (S705). These signal components are received at the RF receiving circuits 19-1 and 19-2, and channels of the known reference signals at the currently selected antennas 11 are estimated (S706). During the time period in which no data are transmitted, steps S704 to S706 are repeated (S707).

At the calibration value controller 93, phase/amplitude correction values are determined for calibration for the respective antennas 11 based upon associated pairs of two channel estimation values (S708). The calibration values (that represent phase/amplitude correction values) are employed at the antenna element/port controller 40 (S709).

In the seventh embodiment, reference signals mutually orthogonal between antennas are transmitted during a time period in which no data are transmitted, and reference signals are detected for channel estimation for two selected antennas 11. The phases and the amplitudes can be compared efficiently between antennas.

Detection of the non-transmission timing of the seventh embodiment may be applied to the structure and the method of the sixth embodiment or the third embodiment. In addition, the seventh embodiment may be combined with the structure and the method of the first, the second, the fourth or the fifth embodiment. In the latter case, two downlink signal streams are received and combined in phase in synchronization with the switching signal from the non-transmission timing detector 91. Channel estimation is performed to determine calibration (or correction) values based upon the outputs from the monitor ports of the selected two antennas 11.

<Eighth Embodiment>

In the eighth embodiment, known reference signals mutually orthogonal between antennae are transmitted at specific time slots, making use of the scheduling function of a scheduler, even if data to be transmitted exist.

Figure 16:
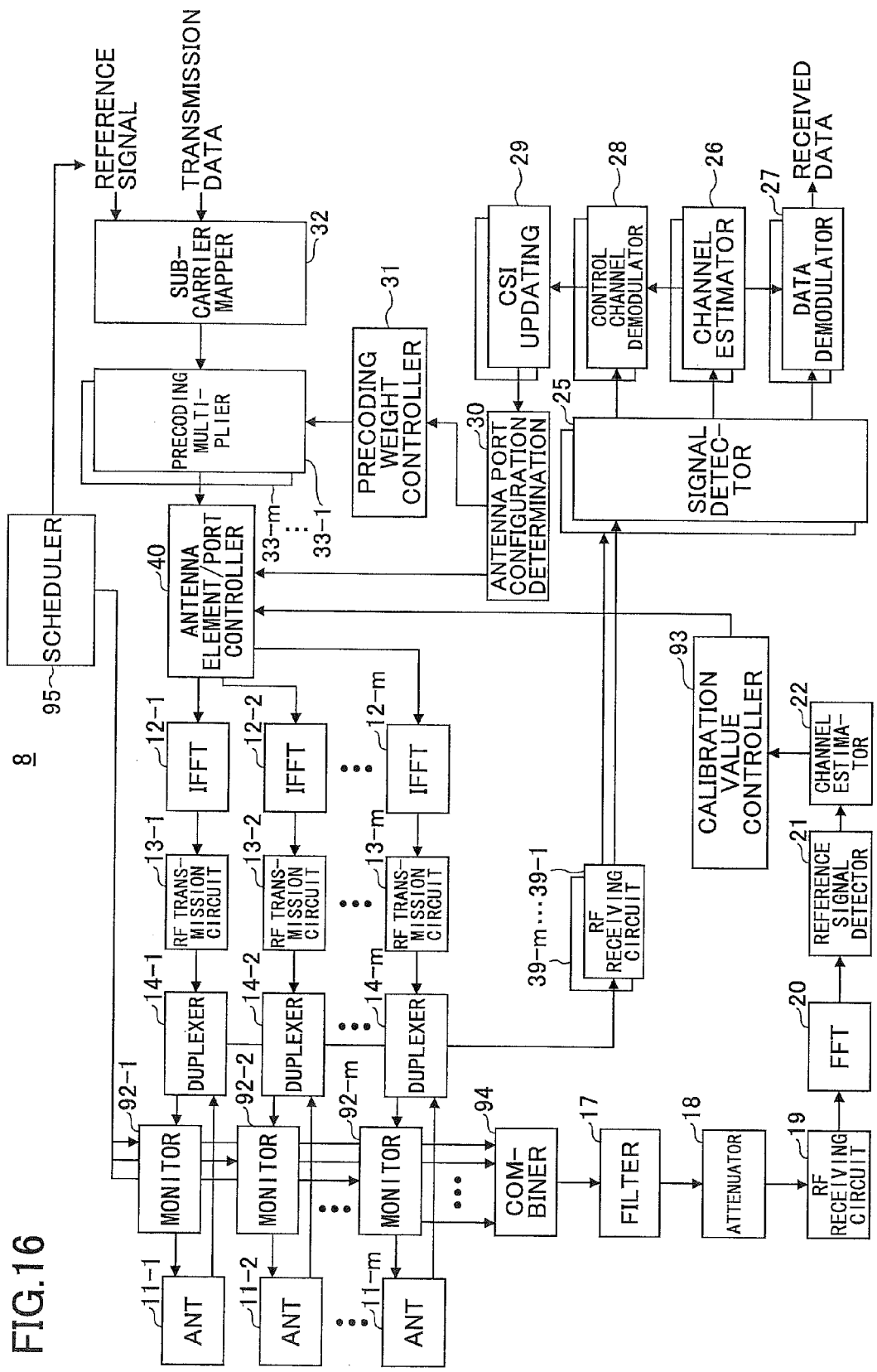
FIG. 16 is a schematic diagram of a base station apparatus according to the eighth embodiment.

FIG. 16 is a schematic diagram of a base station apparatus 8 according to the eighth embodiment. The base station apparatus 8 has a scheduler 95 and monitors 92-1 to 92-m provided for the respective antennas 11.

The scheduler 95 allocates resources such that a known reference signal is transmitted from all the antennas (or antenna ports) 11 at a certain time slot or frequency slot and that the reference signal is orthogonal to the ordinary transmission data position in time, frequency or code.

The scheduler 95 supplies a monitor timing signal to the monitors 92-1 to 92-m at the resource allocation timing. According to the monitor timing signal, the monitors 92-1 to 92-m monitor downlink signals at the calibration receiving system.

The outputs of the monitors 92-1 to 92-m are connected to inputs of a combiner 94. The monitors 92 outputs downlink transmission signal streams synchronizing with the monitor timing signal from the scheduler 95. The monitored downlink signal streams are received and combined in phase as in the fourth or the fifth embodiment in which the downlink transmission signal streams branched at the respective monitors 15 are combined at the combiner 16. The combined downlink signal passes through the filter 17 that passes only downlink signals. The filtered signal is attenuated at the attenuator 18 to the dynamic range of the receiving system, and is subjected to frequency conversion to a baseband frequency at the RF receiving circuit 19.

Each output undergoes processing at the RF receiving circuit 19, the FFT block 20, and the reference signal detector 21. Then the channels of the reference signals for the respective antennas 11 are estimated at the channel estimator 22.

The calibration value controller 93 determines phase/amplitude correction values for calibration for the respective antennas 11 based upon the outputs from the channel estimator 22. The phase/amplitude correction values are supplied as calibration values to the antenna element/port controller 40.

Figure 17:
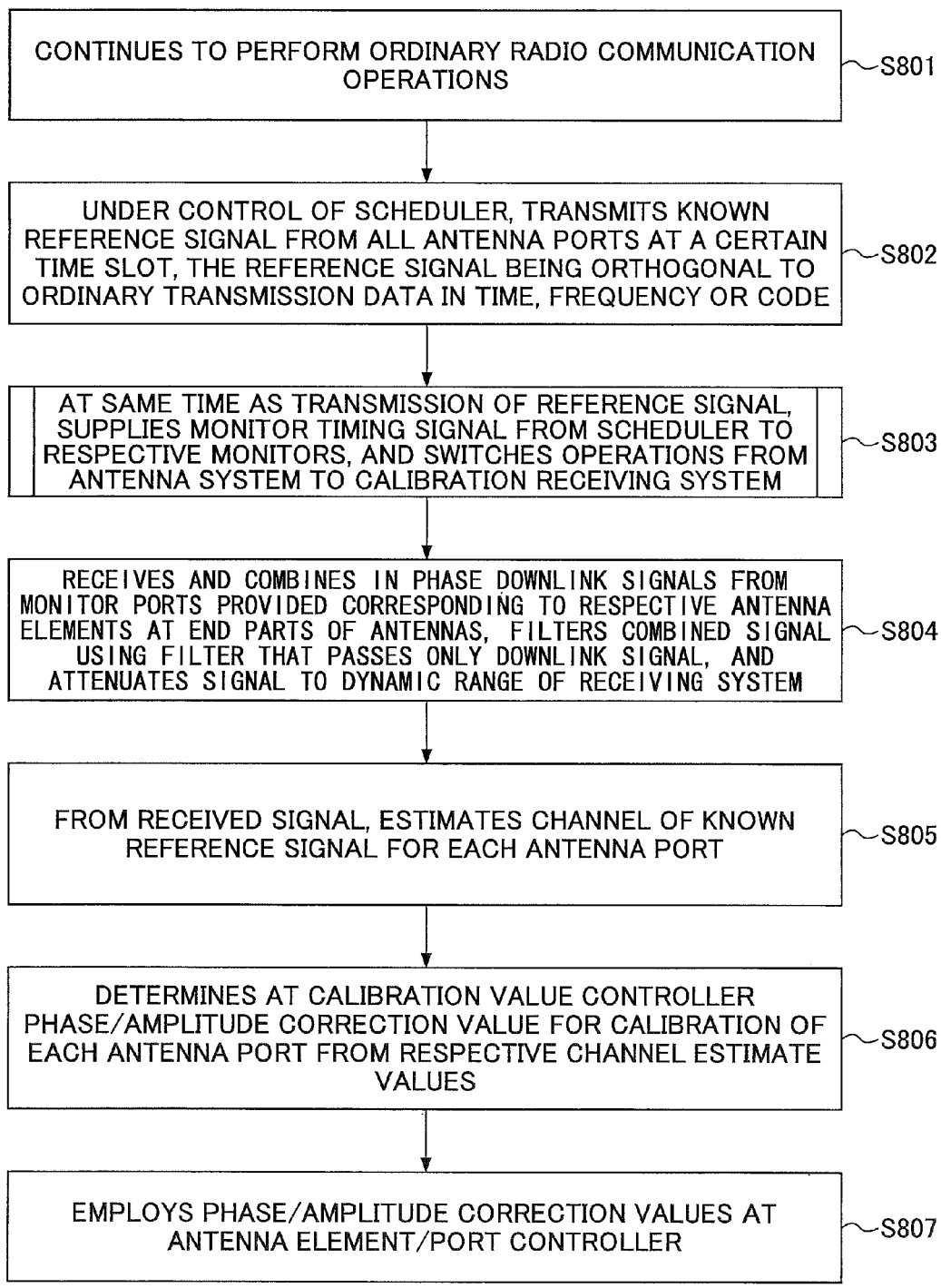
FIG. 17 is a flowchart of a calibration method according to the eighth embodiment.

FIG. 17 illustrates a control flow performed by the base station apparatus 8. The system continues to perform ordinary radio communication operations (S801). At the scheduler 95, scheduling is carried out such that a known reference signal is transmitted from all the antenna ports at a certain time slot and that the reference signal is orthogonal to the ordinary transmission data position (S802).

At the allocation timing, a monitor timing signal is supplied from the scheduler 95 to the monitors 92-1 to 92-m. The monitors 92-1 to 92-m switch the downlink signal output directions from the associated antennas 11 to the calibration system (S803).

At the combiner 94, downlink transmission signal streams from the respective monitors are received and combined in phase synchronizing with the monitor timing signal from the scheduler 95. The combined downlink signal is filtered at the filter that passes only downlink signals and attenuated to the dynamic range of the receiving system (S804). From the signal received at the RF receiving circuit 19, the channel of the known reference signal is estimated for each of the antennas 11 (S805).

At the calibration value controller 93, phase/amplitude correction values are determined for calibration for the respective antennas 11 from the associated channel estimation values (806). At the antenna element/port controller 40, the calibration values representing the phase/amplitude correction values are employed (S807).

In the eighth embodiment, scheduling is carried out by the scheduler such that reference signals mutually orthogonal between antennas are transmitted at time slots or frequency slots that do not conflict with transmission of user data. The reference signal is detected for each of the antennas 11 from the combined received signal, and channel estimation is performed. Accordingly, the phase and the amplitude can be compared between antennas efficiently.

The time slot or frequency slot allocation scheme of the eighth embodiment may be combined with any one of the first through sixth embodiment.

This patent application is based upon and claims the benefit of the priority of Japanese Patent Application No. 2013-168067 filed Aug. 13, 2013, which is incorporated herein by reference in its entirety.

What is claimed is:

1. A base station apparatus comprising:
a plurality of antenna elements;
a combiner configured to receive and combine downlink signals, each including a reference signal, from monitor ports provided corresponding to the plurality of antenna elements;
a channel estimator configured to perform channel estimation for estimating a channel of the reference signal for each of the plurality of antenna elements;
a calibration controller configured to calculate a calibration correction value to be applied to each of the antenna elements based upon channel estimation result; and
multiple antenna ports, each antenna port being formed of one or more of said plurality of antenna elements,
wherein the calibration controller is configured to:
(1) add a phase difference to the respective antenna elements that form associated one of the antenna ports to determine a phase rotation quantity that maximizes the channel estimation result, and calculate a calibration correction value to be applied to each of the antenna ports based upon the determined phase rotation quantity, or
(2) add a random phase difference to the antenna elements that form associated one of the antenna ports, repeat the adding of the random phase difference and the channel estimation multiple times, determine a current phase state of each of the antenna elements from a relationship between a phase rotation quantity acquired when adding the random phase difference and an associated channel estimation value, and calculate a calibration correction value to be applied to each of the antenna ports based upon the determined current phase state of each of the antenna elements.

2. The base station apparatus according to claim 1, further comprising:
a scheduler configured to perform scheduling such that the reference signal is transmitted from all the antenna elements or antenna ports at a time slot or a frequency slot so as to be mutually orthogonal,
wherein the monitor ports are configured to monitor the downlink signals at a timing designated by the scheduler.

3. The base station apparatus according to claim 1, further comprising:
a timing detector configured to detect a timing at which user data are not transmitted,
wherein the monitor ports are configured to switch an output direction of the downlink signals from the antenna elements to a calibration receiving system in response to a switching signal supplied from the timing detector.

4. A calibration method comprising:
receiving and combining downlink signals, each including a reference signal, from monitor ports provided corresponding to antenna elements of a base station apparatus;
extracting each reference signal from the combined downlink signal;
performing channel estimation to estimate a channel of the reference signal for each of the antenna elements;
calculating a calibration correction value to be applied to each of the antenna elements based upon channel estimation result;
forming multiple antenna ports, each antenna port being formed of one or more of the antenna elements; and
(1) adding a phase difference to each of the antenna elements that form associated one of the antenna ports, determining a phase rotation quantity that maximizes the channel estimation result, and calculating a calibration correction value to be applied to each of the antenna ports based upon the determined phase rotation quantity, or
(2) adding a random phase difference to the antenna elements that form associated one of the antenna ports, repeating the adding of the random phase difference and the channel estimation multiple times, determining a current phase state of each of the antenna elements from a relationship between a phase rotation quantity acquired when adding the random phase difference and an associated channel estimation value, and calculating a calibration correction value to be applied to each of the antenna ports based upon the determined current phase state of each of the antenna elements.

5. The calibration method according to claim 4, further comprising:
performing scheduling such that the reference signal is transmitted from all the antenna elements or antenna ports at a time slot or a frequency slot so as to be mutually orthogonal; and
at the monitor ports, monitoring the downlink signals at a timing of the scheduling.

* * * * *